(12) United States Patent
Akiyama et al.

(10) Patent No.: US 8,499,064 B2
(45) Date of Patent: Jul. 30, 2013

(54) CHANGING OPERATING STATE OF A NETWORK DEVICE ON A NETWORK BASED ON A NUMBER OF USERS OF THE NETWORK

(75) Inventors: Kazuhito Akiyama, Kanagawa (JP); Sanehiro Furuichi, Kanagawa (JP); Masami Tada, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 405 days.

(21) Appl. No.: 12/875,211

(22) Filed: Sep. 3, 2010

(65) Prior Publication Data

US 2011/0087905 A1 Apr. 14, 2011

(30) Foreign Application Priority Data

Oct. 14, 2009 (JP) ................. 2009-237369

(51) Int. Cl.
*G06F 15/173* (2006.01)
(52) U.S. Cl.
USPC ........... 709/223; 709/203; 709/220; 709/227; 709/230; 715/733; 715/853
(58) Field of Classification Search
USPC ................. 709/203, 223, 224, 226; 715/733, 715/853
See application file for complete search history.

(56) References Cited

U.S. PATENT DOCUMENTS

| | | | | |
|---|---|---|---|---|
| 7,143,300 B2* | 11/2006 | Potter et al. | | 713/323 |
| 7,386,743 B2* | 6/2008 | Bahali et al. | | 713/300 |
| 7,461,273 B2* | 12/2008 | Moore et al. | | 713/300 |
| 7,702,797 B2* | 4/2010 | Imine | | 709/227 |
| 2004/0217163 A1* | 11/2004 | Savage | | 235/380 |
| 2005/0144234 A1 | 6/2005 | Tanaka et al. | | |
| 2005/0213144 A1* | 9/2005 | Uejo | | 358/1.15 |
| 2005/0228884 A1 | 10/2005 | Hawley | | |
| 2006/0080461 A1* | 4/2006 | Wilcox et al. | | 709/238 |

(Continued)

FOREIGN PATENT DOCUMENTS

| | | |
|---|---|---|
| JP | 05-108283 | 4/1993 |
| JP | 07-152510 | 6/1995 |

(Continued)

OTHER PUBLICATIONS

Office Action mailed Apr. 10, 2012 for U.S. Appl. No. 12/843,137; IBM-0195, 14 pages.

(Continued)

*Primary Examiner* — Michael Won
(74) *Attorney, Agent, or Firm* — Francis Lammes; Stephen J. Walder, Jr.; John D. Flynn

(57) ABSTRACT

Mechanisms for managing a first unit and one or more other units connected to the first unit over a network are provided. The mechanisms detect, by a management unit, an operating state of the other units positioned within a specific range from the first unit on the basis of a location of each of the first and other units over the network. The operating state includes at least an operating state at which a service request is capable of being transmitted to the first unit. The mechanisms further transmit, by the management unit, to the first unit, an instruction to change an operating state of the first unit depending on a number of the other units being in the detected operating state at which the service request is capable of being transmitted.

19 Claims, 7 Drawing Sheets

U.S. PATENT DOCUMENTS

| | | | |
|---|---|---|---|
| 2006/0129665 A1 | 6/2006 | Toebes et al. | |
| 2007/0271475 A1 | 11/2007 | Hatasaki et al. | |
| 2009/0138753 A1 | 5/2009 | Tameshige et al. | |
| 2009/0248867 A1* | 10/2009 | Kishimoto | 709/224 |
| 2009/0313365 A1* | 12/2009 | Whitehead | 709/223 |
| 2011/0087770 A1 | 4/2011 | Akiyama et al. | |
| 2011/0087905 A1* | 4/2011 | Akiyama et al. | 713/320 |
| 2011/0119514 A1* | 5/2011 | Kim et al. | 713/340 |
| 2012/0036250 A1* | 2/2012 | Vaswani et al. | 709/224 |
| 2012/0162495 A1* | 6/2012 | Ogawa | 348/345 |
| 2012/0290702 A1* | 11/2012 | Vincent | 709/223 |
| 2012/0290749 A1* | 11/2012 | Moench et al. | 710/63 |

FOREIGN PATENT DOCUMENTS

| | | |
|---|---|---|
| JP | 07-156512 | 6/1995 |
| JP | 09134234 A | 5/1997 |
| JP | 09-231023 | 9/1997 |
| JP | 09-244830 | 9/1997 |
| JP | 10-283130 | 10/1998 |
| JP | 11-110161 | 4/1999 |
| JP | 2000-020266 | 1/2000 |
| JP | 2000137550 A | 5/2000 |
| JP | 2003050685 A | 2/2003 |
| JP | 2003-122715 | 4/2003 |
| JP | 2004-074530 | 3/2004 |
| JP | 2006251860 A | 9/2006 |
| JP | 2008067122 A | 3/2008 |
| WO | WO 2008/004007 A2 | 1/2008 |

OTHER PUBLICATIONS

Akiyama, Kazuhito et al., "System for Indicating to Network User the Cost of Service Provided to Each Device on Network", U.S. Appl. No. 12/843,137, filed Jul. 26, 2010.

* cited by examiner

330

| 331 | 332 | 333 | 334 | 335 | 336 | 337 |
|---|---|---|---|---|---|---|
| PC1 | HUB-A | 1 | 50 | 170 | RUN | 2 |
| PC2 | HUB-A | 6 | 20 | 170 | RUN | 2 |
| PC3 | HUB-A | 4 | 30 | 170 | RUN | 1 |
| PC4 | HUB-A | 2 | 40 | 170 | UNKNOWN | UNKNOWN |
| PC5 | HUB-B | 2 | 80 | 120 | SLEEP | 0 |
| PC6 | HUB-B | 1 | 70 | 100 | RUN | 3 |
| PC7 | HUB-B | 4 | 120 | 105 | RUN | 2 |
| PC8 | HUB-B | 5 | 110 | 100 | RUN | 1 |

| | 351 | 352 | 353 | 354 | 355 | 356 | 357 | 358 | 359 |
|---|---|---|---|---|---|---|---|---|---|
| | PRINTER 1 | HUB-A | 5 | 30 | 190 | SHUTOFF | 3 | 50 | 4 |
| | PRINTER 2 | HUB-B | 3 | 95 | 100 | STBY | 4 | 50 | 3 |
| | PRINTER 3 | HUB-B | 6 | 110 | 30 | SHUTOFF | 0 | 20 | 3 |
| | PRINTER 4 | HUB-A | 3 | 50 | 60 | SHUTOFF | 0 | 20 | 3 |

350

CHANGING OPERATING STATE OF A NETWORK DEVICE ON A NETWORK BASED ON A NUMBER OF USERS OF THE NETWORK

BACKGROUND

The present invention relates to mechanisms for managing devices that provide service to a client computer on a network, and in particular, to mechanisms for changing an operating state of a device depending on a positional relationship between each device and the client computer to manage devices.

In a typical office environment, business devices, such as printers, scanners, copiers, or facsimiles, are connected to a local area network. Individual network users can freely select one business device from among them and may use it via the local area network.

In most cases, multiple business devices are placed in an office. Several ideas focusing on a physical positional relationship between a user and a business device to improve business device utilization efficiency have been proposed.

For example, Japanese Unexamined Patent Application Publication No. 5-108283 describes a printer management apparatus enabling a printer that is as near as possible to an operator to be selected to print data. With such a management apparatus, when a print request signal is provided by a computer, issuing location determining means determines an issuing location on the basis of previously input location information on the computer. Optimal printer selecting means selects a printer that is nearest to the computer among currently available printers using the information on the locations of printers and the information from the issuing location determining means, and that printer prints print data supplied from the computer.

As a further example, Japanese Unexamined Patent Application Publication No. 7-152510 describes an automatic printer selecting apparatus. The automatic printer selecting apparatus automatically selects a printer that is not in operation and that is near to a terminal to produce printed output from that printer.

SUMMARY

In parallel with the viewpoint of improving user efficiency of clerical works, energy utilization efficiency in the entire office has become a big concern in recent years. For example, for a large-scale office, where many business devices are in operation, it may be necessary to set the devices to a standby state. To address such needs, each business device has the function of shifting to a low power consumption state when it is unused for a certain period of time. However, it has still been difficult to sufficiently reduce energy consumption in the entire office without impairing smooth user actions in the office.

For example, consider a case in which an office has multiple divisions, each having its own printer. Typically, the divisions have different numbers of users at their desks. One division may have a large number of users, whereas another division may have a significantly smaller number of users. The number of users may change from moment to moment through office hours. The number of users at their desks in each division can be determined, but it is difficult to estimate the frequency of actual use of each printer.

Under such conditions, each printer tends to be in a standby state a significant amount of the time for user convenience. For example, after being set in a standby state by a user who appeared for work early in the morning, all printers in an office tend to be in the standby state until night irrespective of the number of users at their desks in the office. Unfortunately, this does not serve the purpose of reducing energy consumption.

In light of these circumstances, it is an object of the illustrative embodiments to reflect user actions in an office to an operating state of each business device in the office more faithfully to improve energy utilization efficiency in the entire office. However, the illustrative embodiments are applicable to not only devices in an office but also a system that includes a single unit and another unit getting service provided by that unit.

With the illustrative embodiments, mechanisms for managing a first unit and one or more other units connected to the first unit over a network are provided. With these mechanisms, an operating state of the other units positioned within a specific range from the first unit is detected by a management unit on the basis of a location of each of the first and other units over the network. The operating state includes at least an operating state at which a service request is capable of being transmitted to the first unit.

Further, an instruction to change an operating state of the first unit is transmitted by the management unit to the first unit depending on a number of the other units being in the detected operating state at which the service request is capable of being transmitted. When the determined number is larger than a specific number, the instruction may be transmitted by the management unit to the first unit, the instruction causing the first unit to shift from an operating state at which first power consumption is indicated to an operating state at which second power consumption is indicated, the second power consumption being larger than the first power consumption.

When the determined number is smaller than a specific number, the instruction may be transmitted by the management unit to the first unit. The instruction causes the first unit to shift from an operating state at which first power consumption is indicated to an operating state at which second power consumption is indicated, the second power consumption being smaller than the first power consumption.

The first unit may be an image forming apparatus. The other units may be capable of transmitting an image forming service request to the first unit. Alternatively, the other units may be application software or computers.

The location of each of the first and other units may be expressed as a distance from the management unit or may be expressed by an identifier for a network segment in the network.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

First, terms used in the specification and claims are explained:

(1) Unit: A unit includes all kinds of devices connectable to a network. For example, a unit may be any of a server computer, portable computer, display, storage device, office machine, such as facsimile and copier, printer, or the like. A unit may be a virtual unit achieved by computer software. Other than the above-mentioned typical examples, a unit does not need to be accommodated in a single casing. In other words, as long as the functions of a unit of the above-mentioned examples are performed, the functions in the unit may be physically distributed. Furthermore, a unit may comprise a program code or codes existing on a computer memory.

(2) Service: A service is a visible or invisible result obtained by the operation of a unit in response to a request from another unit and indicates, for example, printing a document, copying a document, reading a document, transmitting and receiving a document, computation, or the like. In the specification, a unit that requests service is also referred to as a client unit, and a unit that provides service is also referred to as a server unit.

(3) Operating State: Modes of operations of an object are classified into different operating states on the basis of a standard. For example, operating states of a printer can be divided into shutoff, standby, run, and sleep states on the basis of power consumption (details of each state are described below). Alternatively, operating states of a computer can be classified into a user mode and a supervisor mode on the basis of access permissions.

(4) Network Segment: A network segment indicates a portion of a computer network, the portion allowing units connected to the network to communicate with each other through the same physical layer.

(5) Management: Management can include various modes. Management does not necessarily mean controlling all operations of a management target by a management subject. For example, a management subject may simply monitor a part of operations of a management target in a selective manner. Alternatively, a management subject may provide additional information outside of a result of the monitoring.

(6) Range: In the specification, a range is also used in the meaning of a certain range centered on a server unit. A range can be described as various forms, such as a physical distance from a server unit and an identifier for a network segment to which a server unit belongs.

Figure 1:
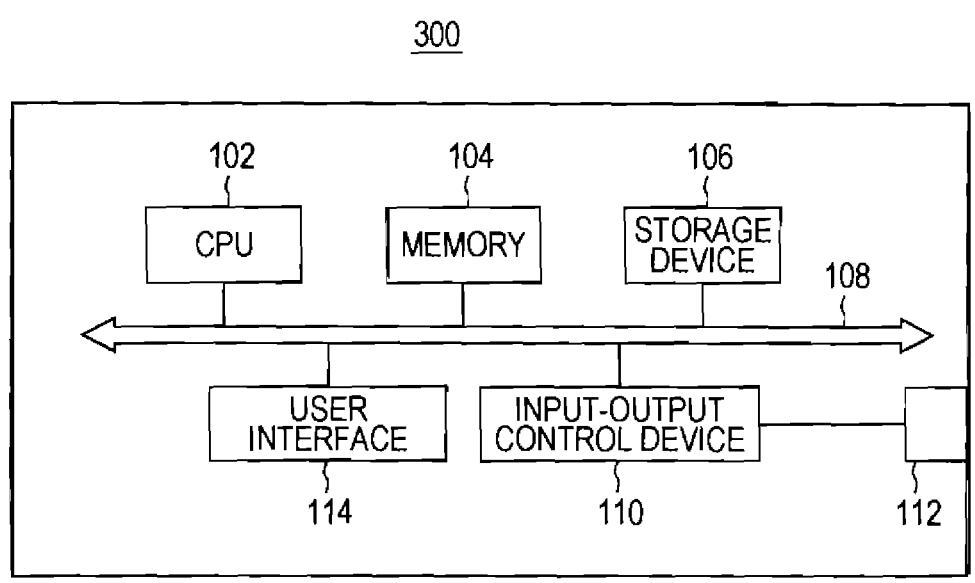
FIG. 1 is an example configuration diagram of hardware for carrying out a management unit according to one illustrative embodiment of the present invention.

FIG. 1 is a diagram that illustrates a hardware configuration for carrying out a management unit 300 according to one illustrative embodiment of the present invention. As shown in FIG. 1, the management unit 300 includes a central processing unit (CPU) 102, a memory 104, a storage device 106, an input-output control device 110, a user interface 114, a bus 108 linking these components, and a communication port 112. A management program code may be stored in the storage device 106 or may also be introduced to the memory 104 from the outside through the communication port 112 and the input-output control device 110. The management program code may be executed by the CPU 102 by being loaded into the memory 104 or may be executed by the CPU 102 while being stored in the storage device 106. In either case, the memory 104 can be also used as a temporary storage memory. The user interface 114 can be used in displaying an operating state of the management unit 300 and inputting an operating mode.

The management program code can be divided into a plurality of portions, and the plurality of portions can be recorded on a plurality of storage media. Alternatively, a part of the plurality of portions into which the code is divided can also be recorded on a storage medium in a different external information processing apparatus connected to the management unit 300 through the communication port 112 and a communication network (not illustrated) linked thereto. The portions into which the code is divided can be coordinated and executed by the CPU 102. Distributing the portions into which the code is divided in a plurality of devices and coordinating these portions of the code are embodied as, for example, a client server system. Determining which portion of the code is to be executed by which device to perform a corresponding function is a selectable matter in system design, and the illustrative embodiments of the present invention embraces both forms described above.

The management unit 300 can be physically divided into functional blocks as described below. A similar hardware configuration to that illustrated in FIG. 1 can be prepared for each functional block, and the functional blocks can be coordinated through their respective communication ports 112. It should be appreciated that the above-described constituents are illustrative, and not all the constituents are necessary constituents of the illustrative embodiments of the present invention. Many modifications to the depicted examples can be made without departing from the spirit and scope of the illustrative embodiments.

An operating system running in the management unit 300 is not indispensable, but it may be one that supports a graphical user interface multi-window environment as standard, such as Windows XP®, AIX®, or Linux®, or alternatively, it may be other operating systems, for example, μiTRON, or the like. The present invention is not limited by any particular operating system environment, however.

A client unit 600 can also be achieved using the same hardware as that of the management unit 300. A server unit 700 can also be achieved using the hardware equivalent to that of the management unit 300 in part thereof. For example, in the case of a printer, as needed, a driving portion of, for example, a photosensitive drum, a paper conveying roller, and a fuser is connected to that hardware through the input-output control device 110.

Figure 2:
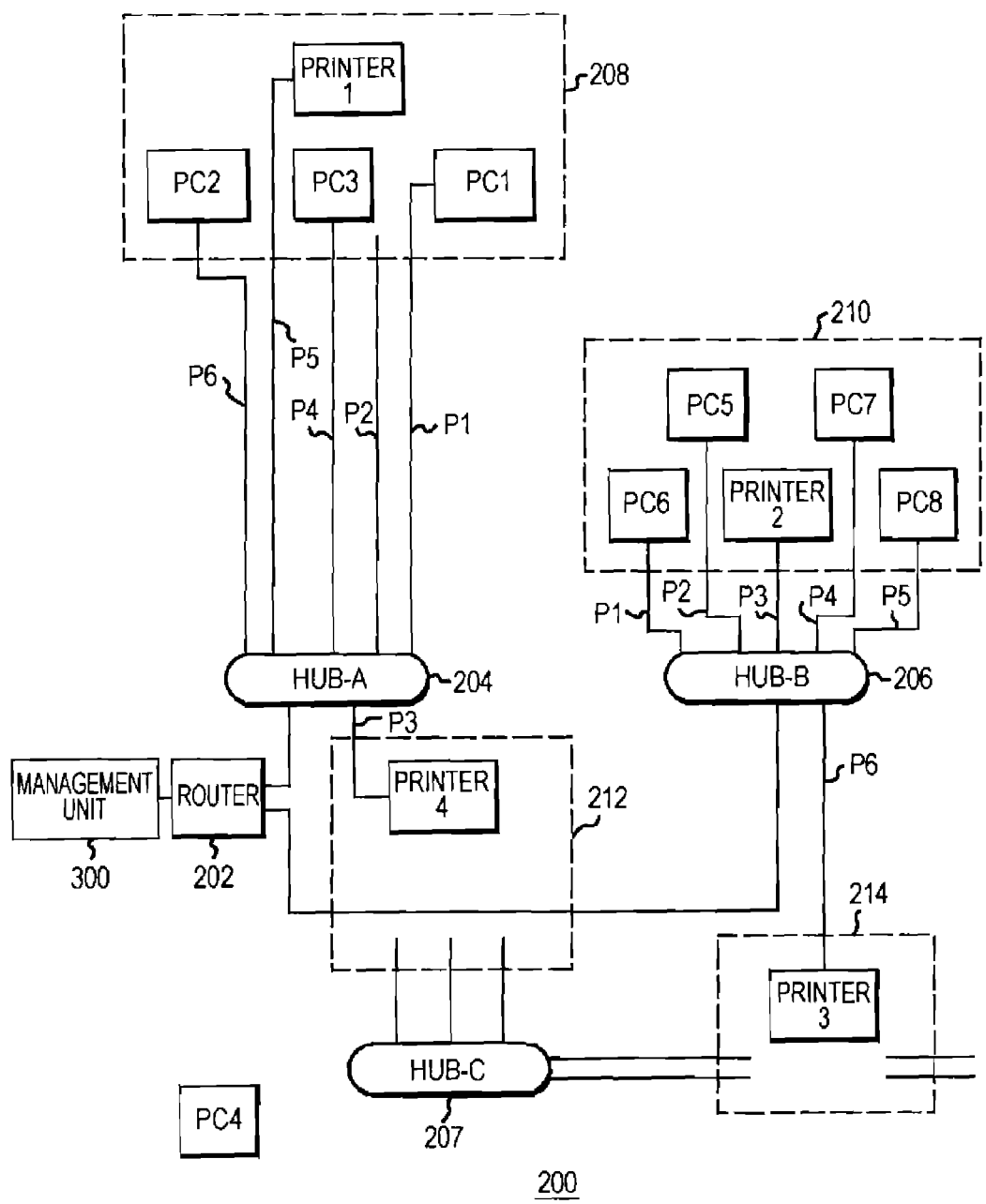
FIG. 2 is an example configuration diagram of a network system in accordance with one illustrative embodiment.

Prior to the further detailed description of the management unit 300, a network system 200 in which the management unit 300 is used will be briefly described. FIG. 2 is a configuration diagram of the network system 200 in which aspects of the illustrative embodiments may be implemented. As shown in FIG. 2, a personal computer is illustrated as an example of the client unit 600, and a printer is illustrated as an example of the server unit 700. The management unit 300 is connected to printers 1 to 4, personal computers 1 to 3 and 5 to 8 through a router 202, a hub-A 204, a hub-B 206, and a hub-C 207, for example.

In this example, the personal computer 4 has not yet been connected to the network system 200. Operations occurring after the personal computer 4 is connected to the network system 200 are described hereafter.

Each hub has a plurality of ports P1 to P6. A first end of a line extending from each port is connected or connectable to a personal computer or a printer. The units can perform data communication with each other with, for example, the transmission control protocol/internet protocol (TCP/IP) protocol. However, the communication protocol is not limited to the TCP/IP protocol.

Figures 3, 4:
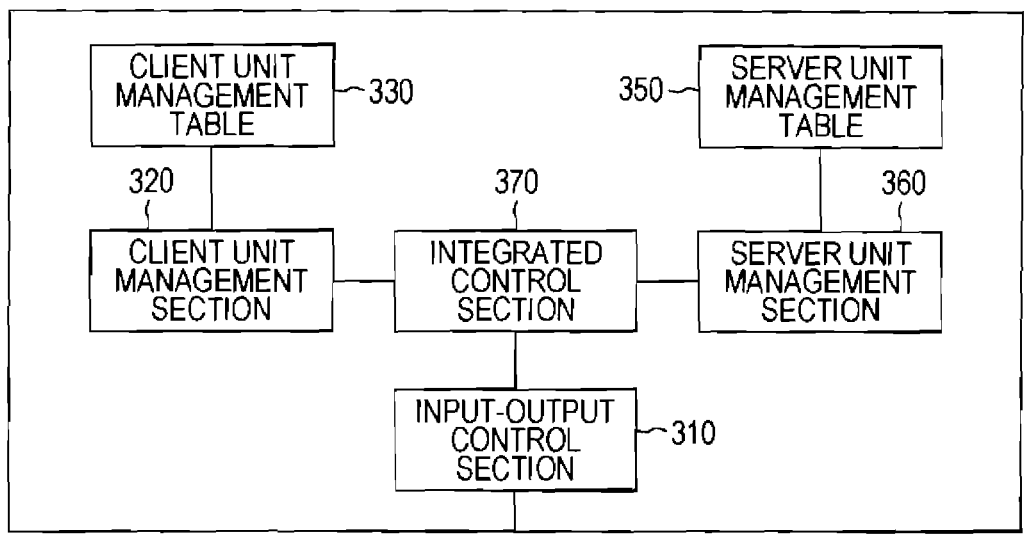
FIG. 3 is an example configuration diagram of functional blocks of the management unit in accordance with one illustrative embodiment.
FIG. 4 is an example configuration diagram of a client unit management table in accordance with one illustrative embodiment.

With reference now to FIG. 3, a configuration diagram of functional blocks of the management unit 300 in accordance with one illustrative embodiments is provided. The functional blocks illustrated in FIG. 3 may be achieved by the hardware illustrated in FIG. 1, for example. Each of the functional blocks is a logic functional block, so it is not necessarily required to be achieved by hardware or software that is formed as a single unit. To the contrary, individual functional blocks can be embodied by separate independent pieces of hardware or hardware coordination, software, or alternatively, common hardware or software.

The management unit 300 includes an input-output control section 310, a client unit management section 320, a client unit management table 330, a server unit management section 360, and a server unit management table 350. In response to a request from an integrated control section 370, the client unit management section 320 generates and updates the client unit management table 330 or reads information from that table and transmits it to the integrated control section 370. The client unit management section 320 can perform data communication with devices connected to the network system 200 through the integrated control section 370 and the input-output control section 310.

FIG. 4 is a configuration diagram of the client unit management table 330. The client unit management table 330 includes an identifier 331 for identifying each personal computer in the network system 200, an identifier 332 for identifying a hub connected to each client unit, and a port number 333 of the hub. The table further includes location information elements 334 and 335 indicating the location of a first end of a line connected to each port of each hub in an office, the first end being connectable to a personal computer.

In the present example, the location information elements are expressed as x and y coordinates in an office in which the network system 200 is laid, but they are not limited thereto. However, for example, the location of each personal computer may also be identified according to logical network partitioning.

These information elements may be input by an administrator of the network system 200 through the user interface 114. Alternatively, the identifier 332 for a hub, port number 333, and location information elements 334 and 335 corresponding to the port number may also be input in advance by an administrator, then the client unit management section 320 may automatically collect the identifier 331 for a personal computer connected to each port from the network system 200 through the input-output control section 310 and may update the identifier 331 for the personal computer corresponding to the port number 333.

Here, the location of each port and the identifier for a personal computer may be associated with each other using, for example, the technique described in Japanese Unexamined Patent Application Publication No. 2006-79350. That is, "association between a MAC address and an information device main body is stored in a database, and the location (desk) at which an end of a port of a hub (end of a local area network (LAN) cable) is used in a layout drawing is stored in a database. This enables an information device main body to be identified from a detected MAC address for information devices connected to the LAN." The detection of a device in a network is made by collecting management information base (MIB) of the network device using the simple network management protocol (SNMP).

The foregoing is merely an example. In other words, as long as the management unit can identify the location of each unit in the network system 200, any method can be used.

The client unit management table 330 may include an operating state 336, indicating an operating state of each personal computer, and a total number 337 (details are described below) of application software, processes, or threads running on each personal computer. The application software, processes, or threads are capable of transmitting a service instruction to a client unit. These information elements are transmitted from each of the client units 600 to the client unit management section 320 through the integrated control section 370 (details are described below).

The client unit management table 330 illustrated here is merely an example, and not all the items in the table are necessarily required. Part of the items in the table may be omitted depending on a use of the management unit.

The input-output control section 310 controls data transmission and reception between an external device and each of the client unit management section 320, the integrated control section 370, and the server unit management section 360. In response to a request from the integrated control section 370, the server unit management section 360 generates and updates the server unit management table 350 or reads information from that table and transmits it to the integrated control section 370. The server unit management section 360 can perform data communication with devices connected to the network system 200 through the input-output control section 310.

Figures 5, 6:
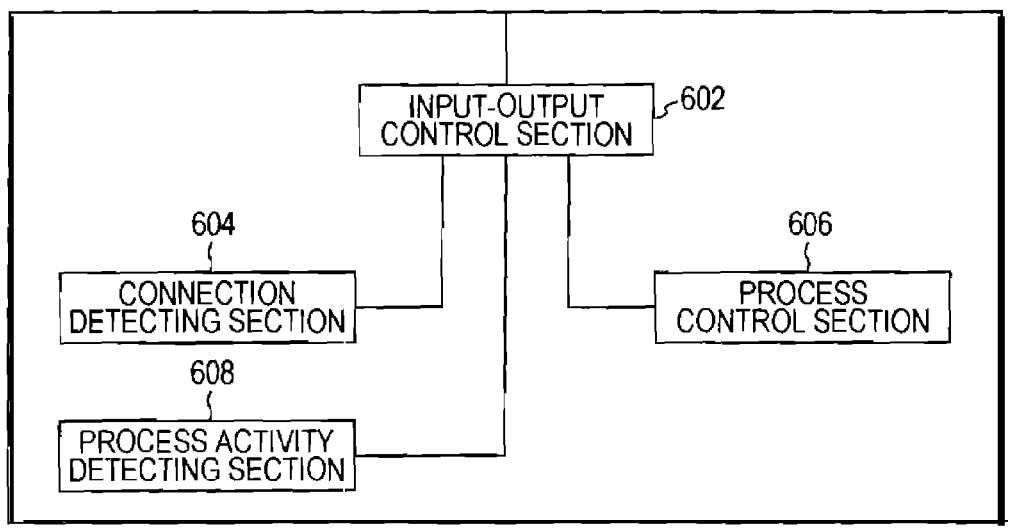
FIG. 5 is an example configuration diagram of a server unit management table in accordance with one illustrative embodiment.
FIG. 6 is an example configuration diagram of functional blocks of a client unit in accordance with one illustrative embodiment.

FIG. 5 is a configuration diagram of the server unit management table 350 in accordance with one illustrative embodiment. The server unit management table 350 includes an identifier 351 for identifying each printer in the network system 200, an identifier 352 for identifying a hub connected to each server unit, and a port number 353 of the hub. The table further includes location information elements 354 and 355 indicating the location of a first end of a line connected to each port of each hub in an office, the first end being connectable to a printer. In the present example, the location information elements are expressed as x and y coordinates in an office in which the network system 200 is laid, but they are not limited thereto.

These information elements may be input by an administrator of the network system 200 through the user interface 114. Alternatively, the identifier 352 for a hub, port number 353, and location information elements 354 and 355 corresponding to the port number may be input in advance by an administrator, and the server unit management section 360 may automatically collect the identifier 351 for a printer connected to each port from the network system 200 through the input-output control section 310 and may update the identifier 351 corresponding to the port number 353. The location of each port and the identifier for a printer may be associated with each other using, for example, the technique described in Japanese Unexamined Patent Application Publication No. 2006-79350.

The server unit management table 350 may include an operating state 356 indicating an operating state of each server unit. The operating state 356 may be acquired by the server unit management section 360 inquiring of a server control section 706 of the server unit 700 through the input-output control section 310. Alternatively, the server control section 706 may notify the server unit management section 360 when the operating state is changed.

That table 350 further includes a specified range 358 (described below) for each server unit. The server unit management table 350 may include a number 357 (described below) of the client units 600 existing within the specified range 358. The table 350 may also include a lower limit 359 (described below) of the number of the client units 600 existing in the specified range 358. The specified range 358, unit number 357, and lower limit 359 may be input by a user. The significance of these numerical values is described below.

The integrated control section 370 accesses the server unit management table 350 through the server unit management section 360 and acquires the range 358 and the lower limit 359 set for a server unit (see FIG. 5). Furthermore, the integrated control section 370 accesses the client unit management table 330 through the client unit management section 320, calculates the total number of client units that exist within the range for the server unit and that are in a run state (described below), and updates the total number 357 (see FIG. 5) in the server unit management table 350.

Here, the run state is illustrative, and the integrated control section 370 may calculate the total number of client units being a state at which a service request can be transmitted to the server unit. The state at which a service request can be transmitted may be merely a state at which a client unit is physically or logically connected to the network system 200.

Which state of a client unit is targeted for counting by the integrated control section 370 can be freely selected depending on a use. When the total number is at or above the lower limit 359, an instruction to shift to a standby state (described below) is transmitted to the server unit. When the total number is lower than the lower limit 359, an instruction to shift to a shutoff state (described below) is transmitted to the server unit. As an alternative, the above total number may be the total number of application software described below.

FIG. 6 is a configuration diagram of functional blocks of the client unit 600 in accordance with one illustrative embodiment. As shown in FIG. 6, the client unit 600 includes an input-output control section 602, a connection detecting section 604, a process control section 606, and a process activity detecting section 608. The input-output control section 602 controls data transmission and reception between an external unit and each of the connection detecting section 604, the process control section 606, and the process activity detecting section 608. The connection detecting section 604 detects connection of the client unit 600 to a port of a hub in the network system 200 and may transmit, for example, the identifier 331 for the client unit to the integrated control section 370 in the management unit.

The integrated control section 370 transfers the received identifier 331 to the client unit management section 320. The client unit management section 320 may identify the hub and port numbers of the hub and port connected to the client unit 600 using the above-described automatic detection technique, associate them with the identifier 331 for the client unit, and update the client unit management table 330.

The process control section 606 includes an operating system and controls application software, a process, or a thread that runs in the client unit 600. The process control section 606 also manages an operating state of the client system in collaboration with the operating system.

For example, the process control section 606 shifts the operating state of the client unit 600 from a run state (a state at which application software can operate) to a sleep state (typically, a state at which execution of application software is stopped, various operating parameters of the client unit 600 stored in, for example, main memory are saved on a secondary storage, and almost all power supply to a sub unit in the client unit 600 is stopped; but other modes are also applicable). In accordance with that shifting, the process control section 606 may transmit the operating state to the integrated control section 370 of the management unit 300.

The process activity detecting section detects an active state of application software, a process, or thread that operates in the client unit 600. For example, the process activity detecting section 608 detects activity or inactivity of application software, a process, or thread capable of transmitting a print instruction to a printer in the network system 200. Application software, a process, or thread capable of transmitting a print instruction to a printer may be registered in advance in a memory in the client unit 600 by a user, and the registered details may be referred to by the process activity detecting section 608. When registered application software or the like is active, the process activity detecting section 608 may count the total number thereof and transmit it to the integrated control section 370 of the management unit 300.

Figure 7:
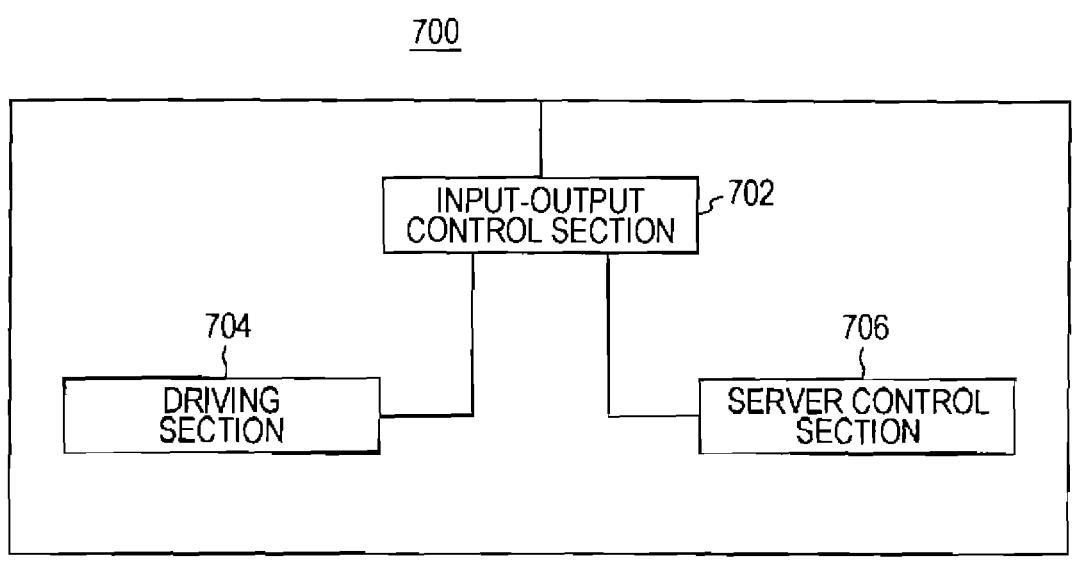
FIG. 7 is an example configuration diagram of functional blocks of a server unit in accordance with one illustrative embodiment.

FIG. 7 is a configuration diagram of functional blocks of the server unit 700 in accordance with one illustrative embodiment. As shown in FIG. 7, the server unit 700 includes an input-output control section 702, a driving section 704, and the server control section 706. The input-output control section 702 controls data communication between the driving section 704 and the server control section 706 and data communication between the server control section 706 and an external device. The driving section 704 operates under control from the server control section 706, operates in response to a service request received from a client unit, and provides service. For example, when the server unit 700 is a printer, the driving section 704 includes an image forming section containing a photosensitive drum, a paper conveying mechanism, and an image fuser.

The server control section 706 retains an operating state (e.g., shutoff, standby) of the server unit 700 and transmits it to the integrated control section 370 of the management unit 300. Here, an example of the operating states when the server unit 700 is a printer is provided.

In consideration of power consumption, a printer can have various operating states. In the specification, for the sake of simplification, the above-described two states, i.e. the shutoff state and the standby state, are discussed.

A shutoff state is a state at which main power supply of a printer is off. Under that state, the power is mainly supplied to a controller board, and the power for maintaining slight functions, such as detecting an operation on a main power supply switch by a user and communicating with an external device, is consumed.

A standby state is a state at which a printer is ready to start an image forming operation upon the receipt of a print instruction. At that state, the power is always supplied to a fuser, and an optical system, a photosensitive drum, and a toner supply unit are also operable. Thus, power consumption in a standby state is larger than that in a shutoff state.

Figure 8:
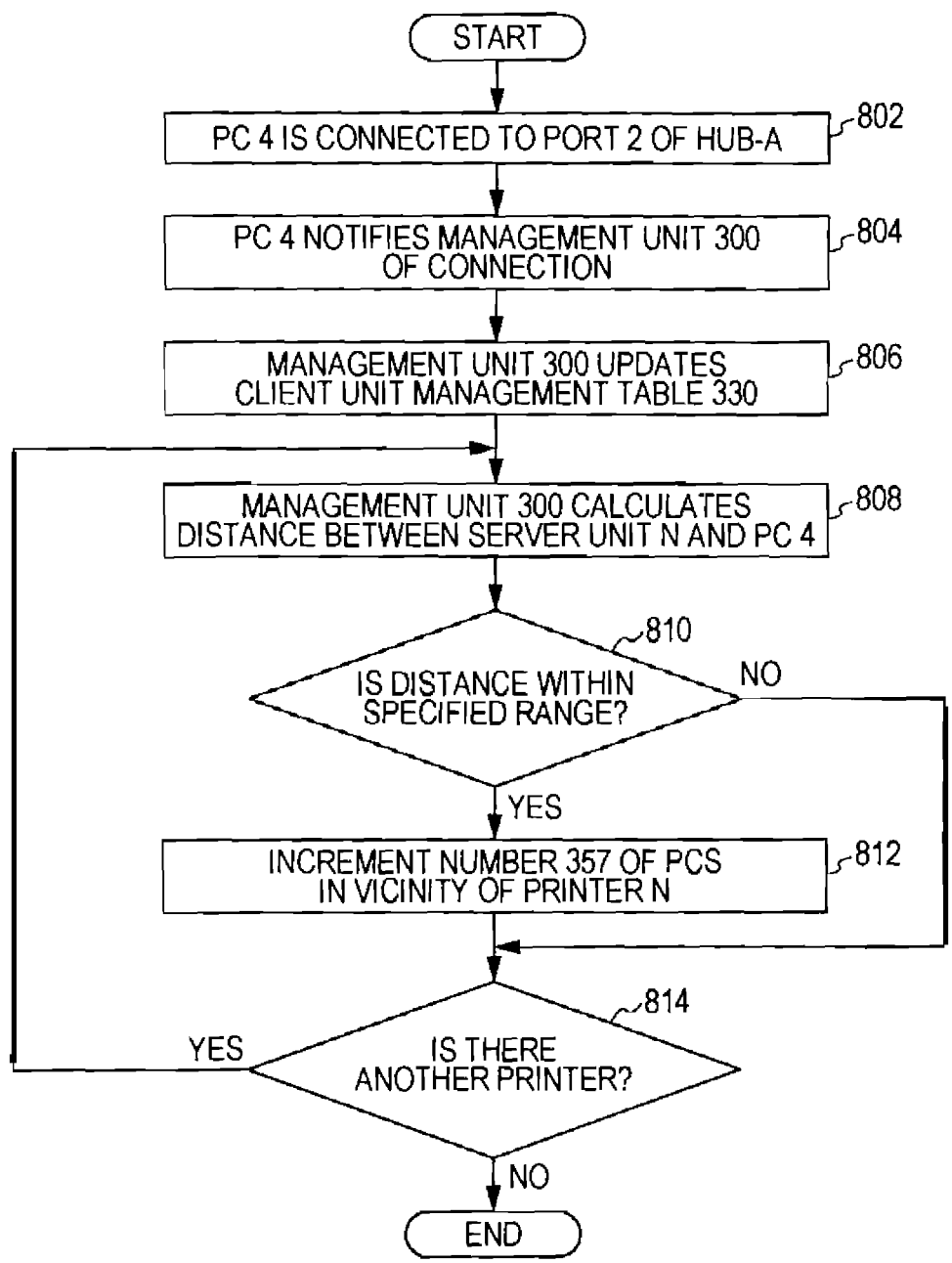
FIG. 8 is an example flowchart that illustrates an example operation of each unit when a personal computer is newly connected to a port of a hub in accordance with one illustrative embodiment.
Figure 9:
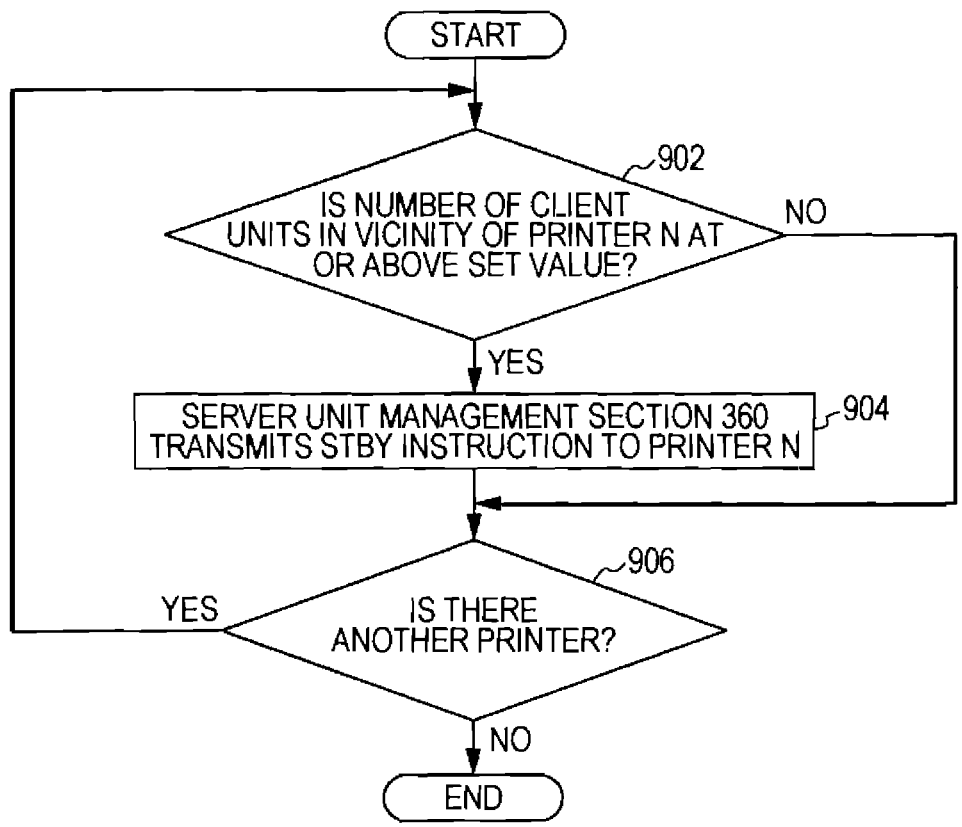
FIG. 9 is an example flowchart that illustrates an example procedure for managing an operating state of each printer by an integrated control section of the management unit in accordance with one illustrative embodiment.

The details of an operation of each unit in accordance with one illustrative embodiment are described above. Here, an overview of the overall operation in accordance with one illustrative embodiment is provided with reference to FIGS. 8 and 9. FIG. 8 is an example flowchart that illustrates an example operation of each unit when the personal computer 4 is newly connected to the port 2 of the hub-A, in accordance with one illustrative embodiment. FIG. 9 is an example flowchart that illustrates an example procedure for managing an operating state of each printer by the integrated control section 370 of the management unit 300 in accordance with one illustrative embodiment.

First, referring back to FIG. 2, the details of the network system 200 are described. In a specified range 208 for the printer 1, the personal computers 1, 2, and 3 are connected to the ports 1, 6, and 4 of the hub-A, respectively. At this time, the unit number 357 corresponding to the printer 1 in the server unit management table 350, illustrated in FIG. 5, is 3.

In a specified range 210 for the printer 2, the personal computers 5, 6, 7, and 8 are connected to the ports 2, 1, 4, and 5 of the hub-B, respectively. At this time, the unit number 357 corresponding to the printer 2 in the server unit management table 350 is 4.

In a specified range 214 for the printer 3 and a specified range 212 for the printer 4, no personal computers are present. The unit number 357 in each of these specified ranges is 0.

Now, the personal computer 4 is newly connected to the port 2 of the hub-A 204 (step 802 in FIG. 8). The connection detecting section 604 of the personal computer 4 detects the connection and transmits the identifier 331 for the personal computer 4 to the integrated control section 370 in the management unit (step 804). The integrated control section 370 of the management unit 300 transmits the identifier 331 to the client unit management section 320. The client unit management section 320 associates the identifier 331 for the personal computer 4 and the port 2 of the hub-A 204 using the above-described technique and updates the client unit management table 330 (step 806).

In this step (step 806), the process activity detecting section 608 of the personal computer 4 may transmit the operating state of the personal computer 4 to the client unit management section 320 through the integrated control section 370, and the operating state 336 in the table may be updated. Alternatively, the process activity detecting section 608 may transmit the total number of active application software capable of transmitting a print instruction to a printer to the client unit management section 320 through the integrated control section 370, and the total number 337 in the table may be updated.

The integrated control section 370 of the management unit 300 calculates the distance between the added personal computer 4 and each printer (step 808). The distance is calculated on the basis of the location of the personal computer stored in the client unit management table 330 and the location of each printer stored in the server unit management table 350. As previously described, the distance may be calculated on the basis of the difference between a network segment to which the personal computer belongs and that to which each printer belongs, for example.

When the calculated distance is within a specified range (YES in step 810), the integrated control section 370 increments the unit number 357 corresponding to the printer in the server unit management table through the server unit management section 360 (step 812). As illustrated in FIG. 5, the current total number 357 of personal computers within the specified range for the printer 1 is 3, so that value is changed to 4. Calculating the distance is repeated (step 814), and the server unit management table 350 is updated. In this way, each printer and the total number of active personal computers within a specified range for the printer, or the total number 357 of active applications in the server unit management table 350, is always updated when configuration of the network system 200 is changed. In a similar way, in response to removal of a personal computer or printer from a network system, the client unit management table 330 and the server unit management table 350 are updated.

FIG. 9 is an example flowchart that illustrates an example server unit management operation of the integrated control section 370 of the management unit 300 in accordance with one illustrative embodiment. The integrated control section 370 of the management unit 300 refers to the server unit management table 350 through the server unit management section 360 and compares the total number of personal computers within a specified range for each printer or the total number 357 of active applications (described above) within that range with the lower limit 359 for the printer (step 902). When the total number 357 is at or above the lower limit 359 (YES in step 902), the integrated control section 370 transmits an instruction to shift to a standby state to that printer (step 904). Alternatively, when the total number 357 is smaller than the lower limit (NO in step 902), the integrated control section 370 may transmit an instruction to shift to a shutoff state to that printer. The above-described processing is repeated for each printer (step 906). The foregoing operation may be repeated by the integrated control section 370 at regular time intervals.

As described above, with the management unit 300 according to the present invention, an operating state of a server unit is automatically changed in response to the total number of client units existing within a specified range in the vicinity of the server unit. For example, if personal computers in the vicinity of a printer are connected to a network by many users, that printer is in a standby state to respond to a request from a user all the time; if the number of users is reduced, that printer is shifted to a shutoff state to minimize power consumption.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing a first unit and a plurality of other units connected to the first unit over a network, the network being connected to a management unit, the method comprising:

detecting, by the management unit, an operating state of a subset of the plurality of other units positioned within a specific range from the first unit on the basis of a location of each of the first unit and the plurality of other units over the network, the operating state including at least an operating state at which a service request is capable of being transmitted to the first unit; and transmitting, by the management unit, to the first unit, an instruction to change an operating state of the first unit depending on a number of the subset of other units being in the detected operating state at which the service request is capable of being transmitted, wherein the first unit is an image forming apparatus, and the plurality of other units are configured to transmit an image forming service request to the first unit and wherein the location of each of the first unit and the plurality of other units is expressed as a distance from the management unit.

2. The method according to claim 1, wherein, when the determined number is larger than a specific number, the instruction is transmitted by the management unit to the first unit, the instruction causing the first unit to shift from an operating state at which first power consumption is indicated, to an operating state at which second power consumption is indicated, the second power consumption being larger than the first power consumption.

3. The method according to claim 1, wherein, when the determined number is smaller than a specific number, the instruction is transmitted by the management unit to the first unit, the instruction causing the first unit to shift from an operating state at which first power consumption is indicated, to an operating state at which second power consumption is indicated, the second power consumption being smaller than the first power consumption.

4. The method according to claim 3, further comprising:
acquiring the specific range and the specific number associated with the first unit from a data structure storing entries for a plurality of first units, wherein the specific range and the specific number are different for at least two of the first units in the plurality of first units.

5. The method according to claim 1, wherein the plurality of other units are application software.

6. The method according to claim 1, wherein the plurality of other units are computers.

7. The method according to claim 1, wherein the location of each of the first unit and the plurality of other units is expressed by an identifier for a network segment in the network.

8. An apparatus for managing a first unit and a plurality of other units connected to the first unit over a network, the apparatus comprising:
a client unit management section that detects an operating state of a subset of other units in the plurality of other units positioned within a specific range from the first unit on the basis of a location of each of the first unit and the plurality of other units over the network, the operating state including at least an operating state at which a service request is capable of being transmitted to the first unit; and
an integrated control section that transmits, to the first unit, an instruction to change an operating state of the first unit depending on a number of the subset of other units being in the detected operating state at which the service request is capable of being transmitted, wherein the first unit is an image forming apparatus, and the plurality of other units are configured to transmit an image forming service request to the first unit and wherein the location of each of the first unit and the plurality of other units is expressed as a distance from the management unit.

9. The apparatus of claim 8, wherein, when the determined number is larger than a specific number, the instruction is transmitted by the management unit to the first unit, the instruction causing the first unit to shift from an operating state at which first power consumption is indicated, to an operating state at which second power consumption is indicated, the second power consumption being larger than the first power consumption.

10. The apparatus according to claim 8, wherein, when the determined number is smaller than a specific number, the instruction is transmitted by the management unit to the first unit, the instruction causing the first unit to shift from an operating state at which first power consumption is indicated, to an operating state at which second power consumption is indicated, the second power consumption being smaller than the first power consumption.

11. The apparatus according to claim 8, wherein the plurality of other units are application software.

12. The apparatus according to claim 8, wherein the plurality of other units are computers.

13. The apparatus according to claim 8, wherein the location of each of the first unit and the plurality of other units is expressed by an identifier for a network segment in the network.

14. A computer program product for managing a first unit and a plurality of other units connected to the first unit over a network comprising a computer readable storage device having a computer readable program stored therein, wherein the computer readable program, when executed on a computing device, causes the computing device to:
detect an operating state of a subset of other units in the plurality of other units positioned within a specific range from the first unit on the basis of a location of each of the first unit and the plurality of other units over the network, the operating state including at least an operating state at which a service request is capable of being transmitted to the first unit; and
transmit, to the first unit, an instruction to change an operating state of the first unit depending on a number of the subset of other units being in the detected operating state at which the service request is capable of being transmitted, wherein the first unit is an image forming apparatus, and the plurality of other units are configured to transmit an image forming service request to the first unit and wherein the location of each of the first unit and the plurality of other units is expressed as a distance from the management unit.

15. The computer program product of claim 14, wherein, when the determined number is larger than a specific number, the instruction is transmitted by the management unit to the first unit, the instruction causing the first unit to shift from an operating state at which first power consumption is indicated, to an operating state at which second power consumption is indicated, the second power consumption being larger than the first power consumption.

16. The computer program product according to claim 14, wherein, when the determined number is smaller than a specific number, the instruction is transmitted by the management unit to the first unit, the instruction causing the first unit to shift from an operating state at which first power consumption is indicated, to an operating state at which second power consumption is indicated, the second power consumption being smaller than the first power consumption.

17. The computer program product according to claim 14, wherein the plurality of other units are application software.

18. The computer program product according to claim 14, wherein the plurality of other units are computers.

19. The computer program product according to claim 14, wherein the location of each of the first unit the plurality of other units is expressed by an identifier for a network segment in the network.

* * * * *